July 19, 1960 C. L. RICARDS ET AL 2,945,438
PLATE LOCKING MECHANISM
Filed May 28, 1956 7 Sheets-Sheet 3

INVENTORS
CHARLES L. RICARDS
PAUL L. TOLLISON
LEONARD R. CAMPBELL
SAM ODERMAN
BY
Pennie Edmonds, Morton Barrows &Taylor
ATTORNEYS July 19, 1960 C. L. RICARDS ET AL 2,945,438
PLATE LOCKING MECHANISM
Filed May 28, 1956

INVENTORS
CHARLES L. RICARDS
PAUL L. TOLLISON
LEONARD R. CAMPBELL
SAM ODERMAN
BY Pennie, Edmonds,
Morton, Barrows & Taylor
ATTORNEYS

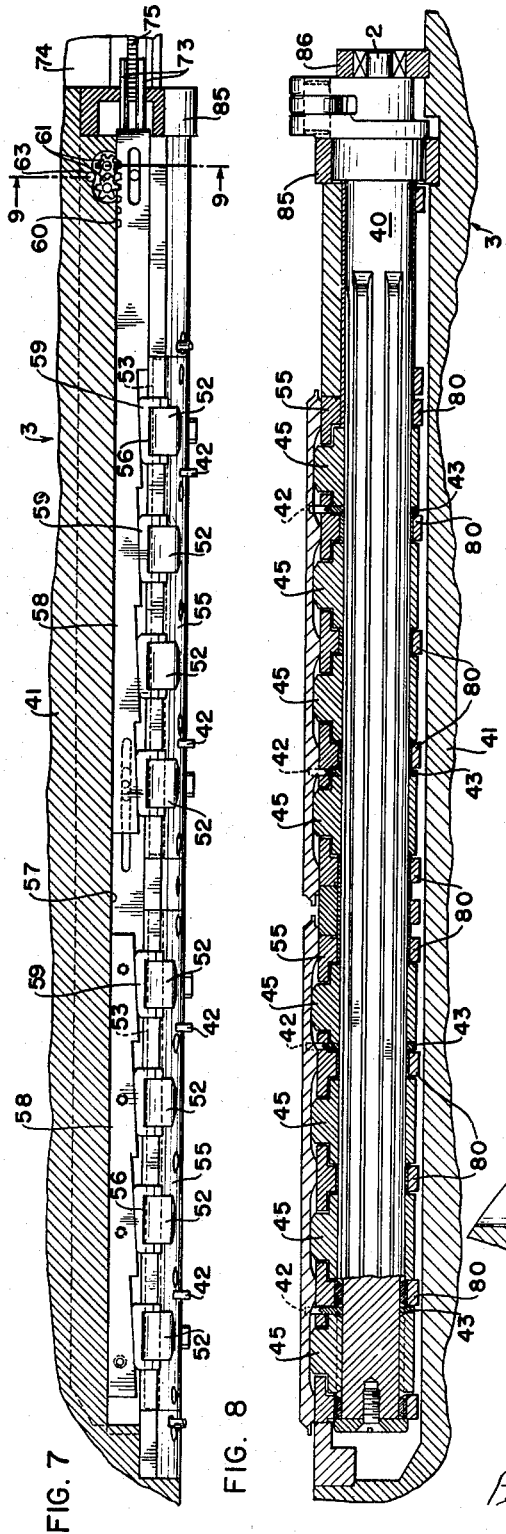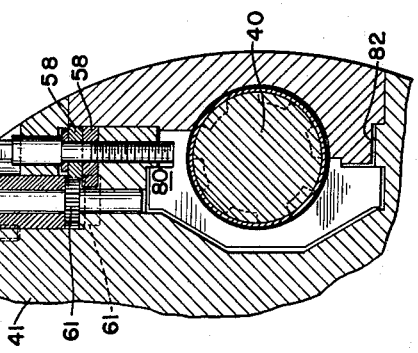

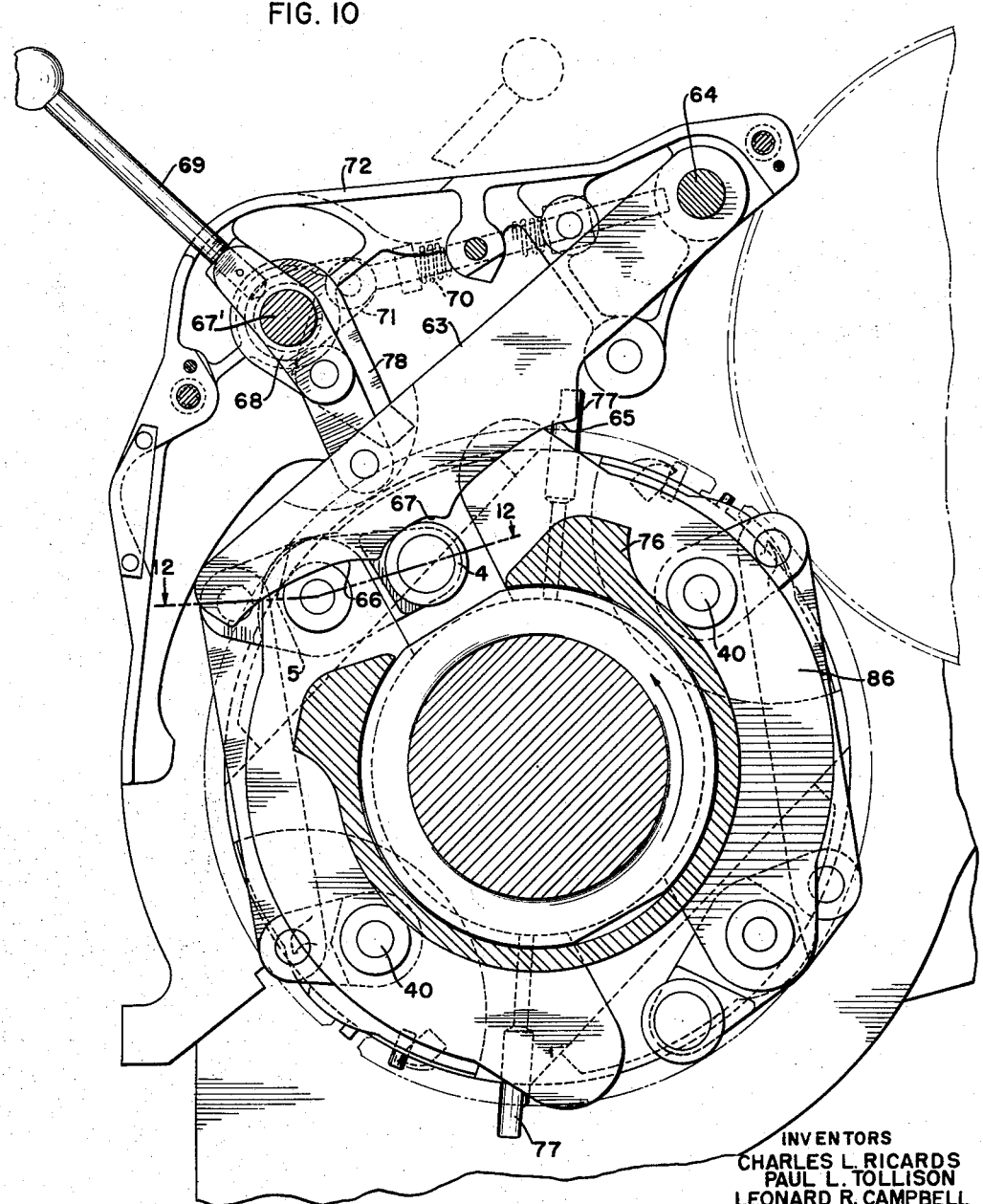

July 19, 1960

C. L. RICARDS ET AL 2,945,438

PLATE LOCKING MECHANISM

Filed May 28, 1956

INVENTORS
CHARLES L. RICARDS
PAUL L. TOLLISON
LEONARD R. CAMPBELL
SAM ODERMAN
BY
ATTORNEYS

United States Patent Office 2,945,438
Patented July 19, 1960

2,945,438

PLATE LOCKING MECHANISM

Charles L. Ricards, South Plainfield, Paul L. Tollison, North Plainfield, Leonard R. Campbell, New Brunswick, and Sam Oderman, West Deal, N.J., assignors to Wood Newspaper Machinery Corporation, Plainfield, N.J., a corporation of Virginia Filed May 28, 1956, Ser. No. 587,635

10 Claims. (Cl. 101—378)

This invention relates to quick acting lock-up mechanism for securing printing plates to the plate cylinders of printing presses under tension circumferentially of the cylinders and for releasing the plate from the cylinders. More specifically the invention relates to the type of lock-up mechanism disclosed in our prior Patent No. 2,474,127, dated June 21, 1949, and the invention embodies improvements on the mechanism disclosed in said prior patent in a number of important respects. One of the important features of our present invention is the provision of power actuated controls for effecting the lock-up of the plates, so designed that the cylinder must be in proper position before the plates can be released and the press motor cannot be again started until the lock-up is effected.

Our improved lock-up mechanism comprises means for accurately adjusting the circumferential distance between the plate engaging hooks against which one edge of the plate is held by the spring tension applied to the opposite edge of the plate. By this adjustment the plates can be moved circumferentially of the cylinder to thereby secure the precise positioning of the plates necessary in color printing particularly.

Our improved lock-up mechanism also embodies provisions for positively moving the edge of the plate away from the cylinder when the lock-up hooks are retracted so that the plate is loosened from its grip in the cylinder and may be readily grasped by the press operator to thereby lessen the time required to change the plates on the cylinders.

Our improved mechanism also embodies changes in the cylinder construction and in the design of the several parts to facilitate the accurate assembly of the parts on the cylinder and provide for their ready removal and greater accessibility for adjustment and repair. Our improved cylinder construction also facilitates the relocation of the parts in the cylinder for various widths of plates and webs.

Other objects of the invention will appear from the following description taken in connection with the accompanying drawings wherein we have disclosed our improved power operated lock-up operating mechanism and also an improved cam actuated mechanism both in connection with the other novel features of our invention.

Figure 6:
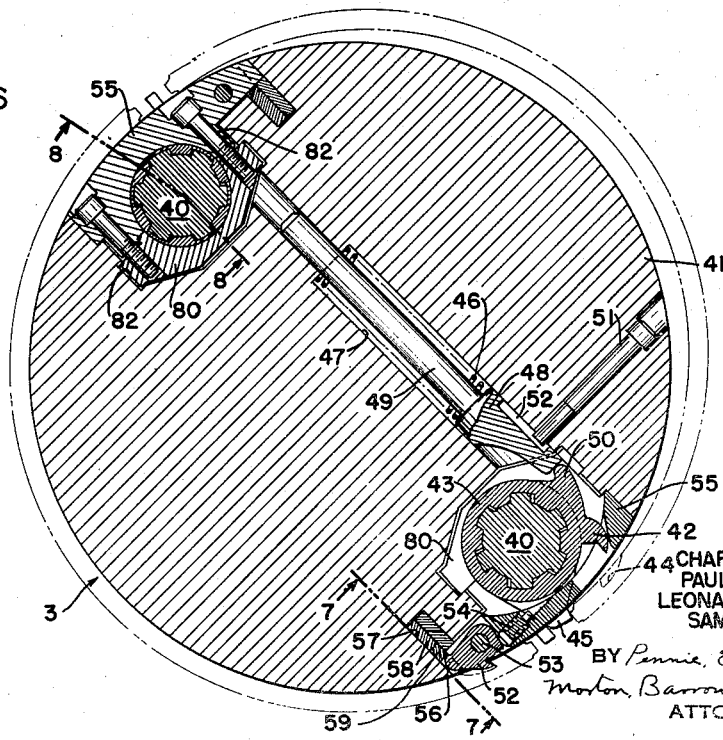
Fig. 6 is a transverse view through the printing cylinder on line 6—6 of Fig. 4 but on the same scale as Fig. 5.
Figure 12:
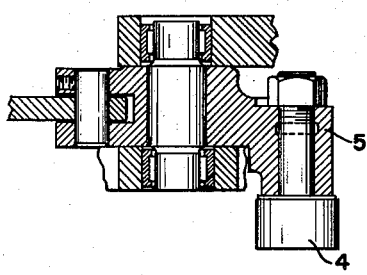
Figure 11:
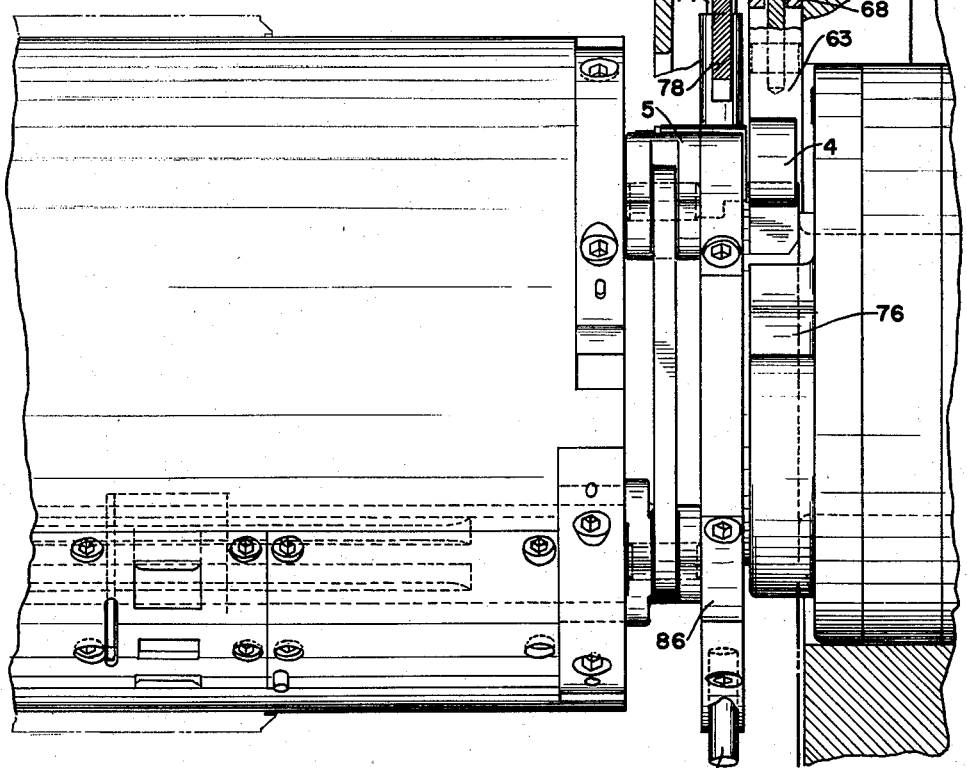

Figs. 7 and 8 are longitudinal sections on lines 7—7 and 8—8, respectively, of Fig. 6;

Fig. 9 is a detail view on an enlarged scale on line 9—9 of Fig. 7;

Fig. 10 is a transverse section on line 10—10 of Fig. 11 showing the hand operated control for the cam-operated lock-up mechanism;

Fig. 11 is a side elevation partly in section of the mechanism shown in Fig. 10; and Fig. 12 is a detail view on line 12—12 of Fig. 10.

As in our former machine, the apparatus for effecting the operation of the lock-up mechanism of the cylinder is supported on the frame of the press adjacent the ends of the cylinders and consists essentially of substantially radially movable cam members which when moved inwardly engage and actuate rock arms carried by the cylinder and which through suitable linkage turn the lock-up hooks in a direction to release the plates. Also as in our former machine, the radially movable cams, when shifted outwardly beyond the path of movement of the rock arms, permit the lock-up hooks to engage the notches in the plates and hold them under tension. In the machine of our former patent the movement of the lock-up hooks is effected by the rotation of the printing cylinder relatively to the radially movable cam members, while in the machine of the present application the lock-up and release may be effected while the cylinder is stationary.

Figure 1:
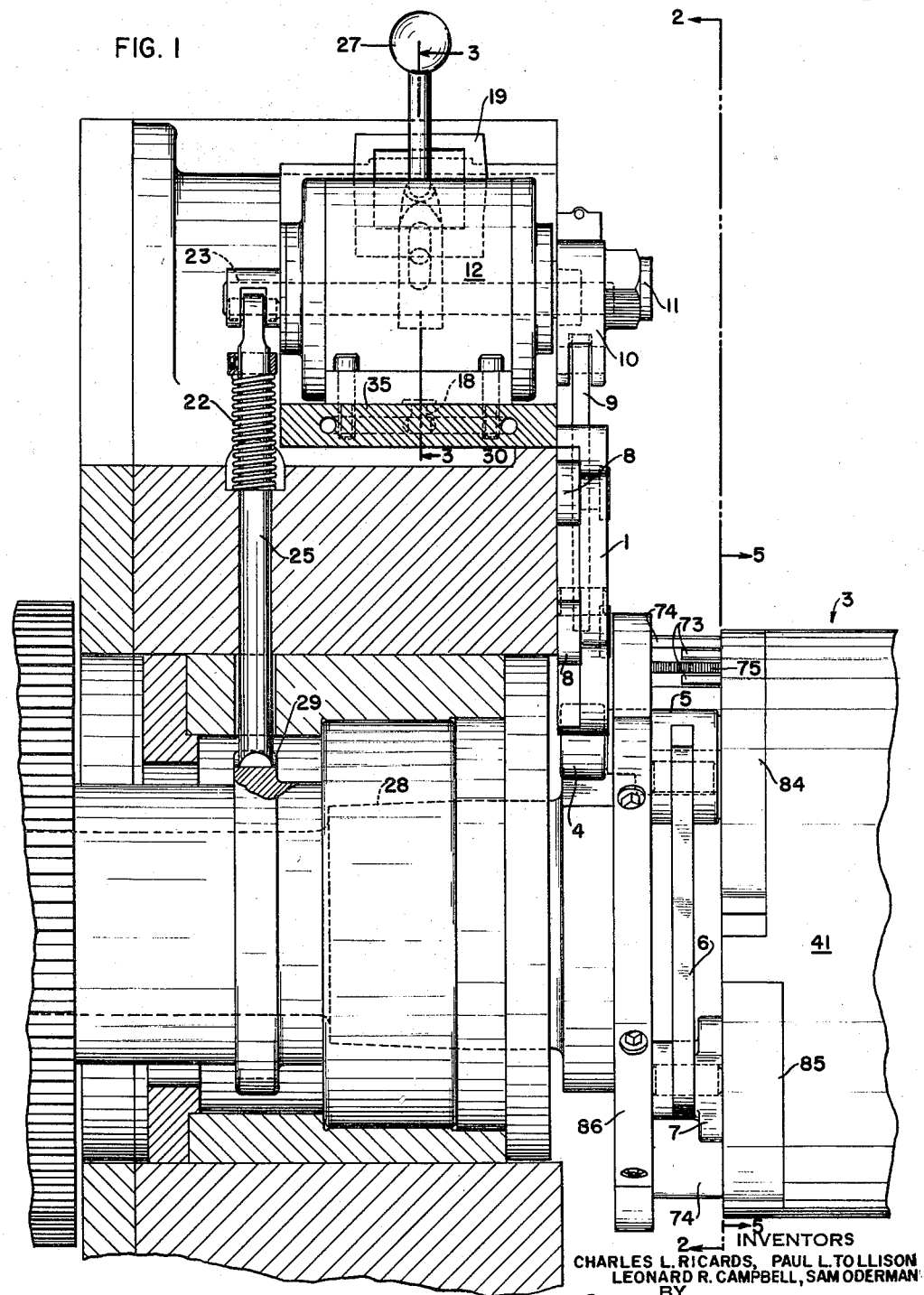
Fig. 1 is a vertical section through the bearing of the printing cylinder of the power operated lock-up mechanism with the printing cylinder and certain parts of the control mechanism shown in elevation.
Figure 2:
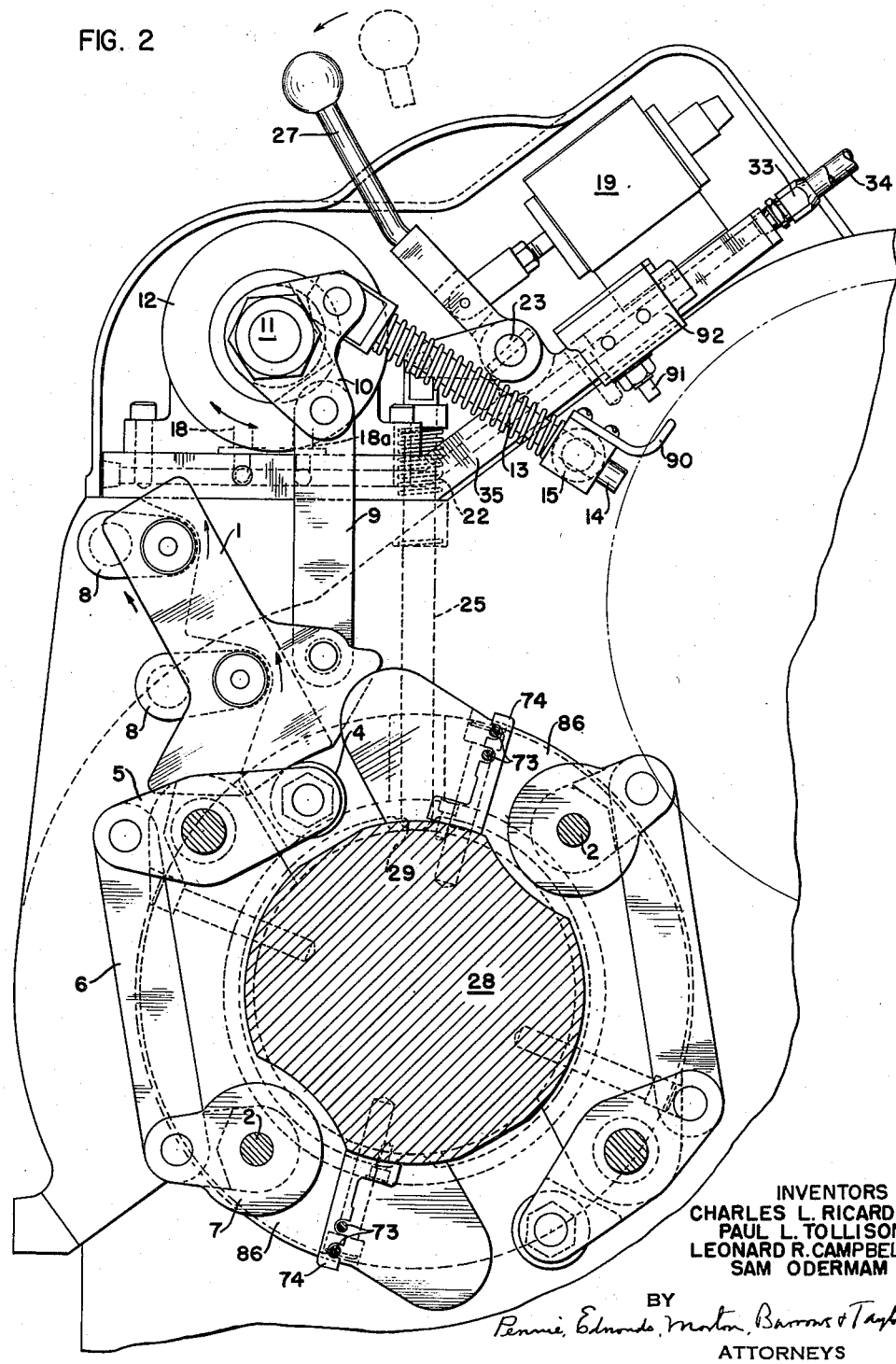
Fig. 2 is a transverse section on line 2—2 of Fig. 1.

In the drawings, referring specifically to Figs. 1 and 2, 1 indicates the substantially radially movable cam member which effects the oscillation of the shaft 2 carried by the printing cylinder 3 and to which the tension lock-up hooks are attached. The cam member 1, when moved inwardly engages the roller 4 on the end of a rock arm 5 which is connected by a link 6 to the crank arm 7 attached to the end of the shaft 2.

The cam member 1 is supported by parallel links 8 and is moved inwardly and outwardly by a link 9 attached to one arm of a bell crank 10 mounted on the end of the shaft 11 of an ocsilating piston mounted in a cylinder 12 attached to the printing press frame as shown more particularly in Fig. 2. Links 8 are so proportioned and their pivot centers so placed that the lower concave cam portion of the cam member 1 moves in a direction toward the center of the cylinder at all points, thereby insuring that there is no component of force tending to rotate the cylinder during clamping and unclamping. The cam member 1 is held in both its inner and outward positions by a spring 13 carried by a rod 14 pivoted to the other arm of the bell crank 10. The free end of the rod 14 slides in a block 15 carried by a stationary pivot on the machine frame. The shaft 11 to which the bell crank 10 is attached is oscillated by fluid pressure which may be either hydraulic or pneumatic. To this end the mid-portion of the shaft 11 within the cylinder 12 (see Fig. 3) is provided with oppositely positioned radial vanes 16. The annular space between the shaft 11 and the inner wall of the cylinder is divided into two chambers by the fixed bars 17 whose inner surfaces closely fit the surface of the shaft 11.

Figure 3:
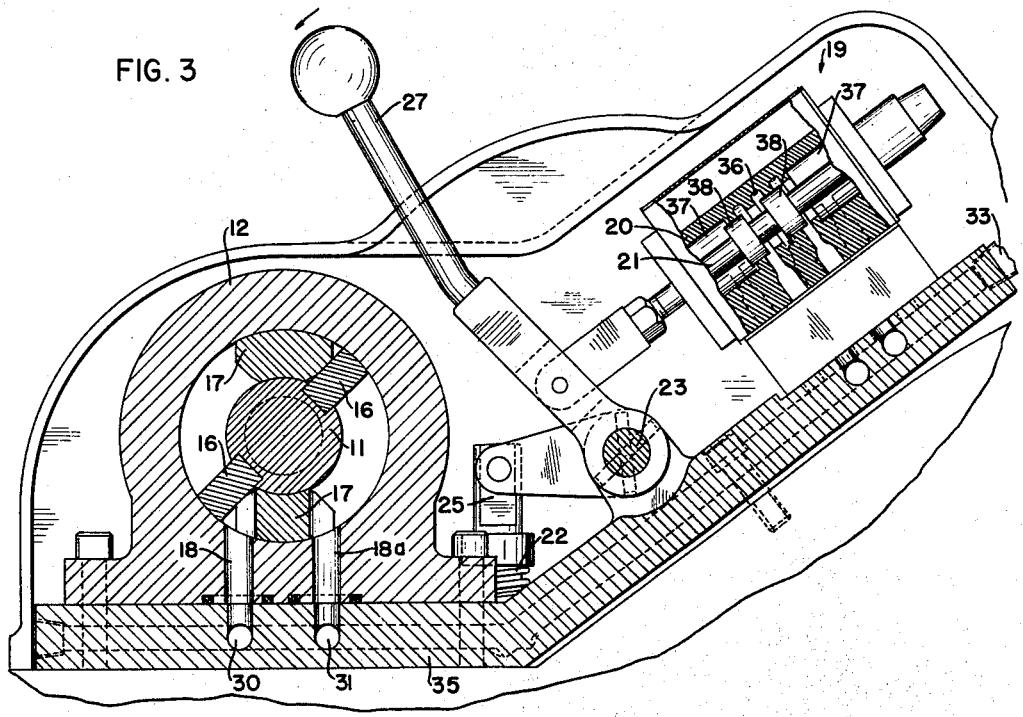
Fig. 3 is a transverse section on line 3—3 of Fig. 1.

Ports 18, 18a are provided in the base of the cylinder 12 for the admission of fluid under pressure to the cylinder on either side of the lower block 17. The admission of fluid to the cylinder is controlled by a valve 19, shown more particularly in Fig. 3, comprising a cylinder 20 and piston 21. In Fig. 3 the valve is shown in the position to which it is adjusted to effect the inward movement of the cam 1. That is to say, the port 18a has been connected with the source of pressure and the shaft 11 has been turned through its counter clockwise movement. The spring 22 which counterbalances the weight of the valve 21 and its connected parts, is mounted on a rod 25 which extends through a bore in the machine frame overlying the supporting bearing for the cylinder shaft 28 and into position to project into a notch 29 in a collar formed on the shaft of the cylinder. By this arrangement the valve piston 21 cannot be shifted to its lower position except when the notch 29 underlies the rod 25.

The ports 18 and 18a of the cylinder 12 are connected, respectively, with the bores 30 and 31 leading from the valve cylinder 20. The bores are formed in a casting 35 of angular configuration as shown in Figs. 2 and 3, which casting serves as a base for the cylinder 12 and the valve cylinder 20 and also provides a bearing for the shaft 23 to which the valve operating handle 27 is attached. As will be noted, the valve cylinder 20 has a port 36 mid-way its length connected by a bore in the base plate 35 with a pipe 33 through which fluid under pressure is delivered to the cylinder. Ports 37 adjacent the ends of the cylinder are similarly connected to an exhaust pipe 34. The piston valve 21 is formed with spaced heads 38 which in mid-position close the bores 31, 32 leading, respectively, to the ports 18, 18a of the cylinder 12. Movement of the valve piston in one direction connects the port 18 with the source of pressure and the port 18a with the exhaust pipe 34. Movement in the opposite direction effects a reverse connection.

The weight of the valve piston 21, handle 27 and rod 25 is counterbalanced by the spring 22 and the valve is preferably held against accidental movement from its right or left position as above described by detail, not shown. The operation will be further described in conjunction with the plate tensioning mechanism.

Referring now to Figs. 5 to 8, the tension lock-up mechanism comprises plate engaging hooks 42 (see Fig. 6), mounted on splined shafts 40 extending axially of the cylinder 41 at diametrically opposite points. The plate engaging hooks 42 are mounted on the shafts 40 at spaced intervals corresponding with the position of the notches 44 in the inner face of the plates along their opposite longitudinal edges. Spacing sleeves 43 are mounted on the shafts 40 between the hooks 42 which sleeves also serve as bearings for the shafts.

Our improved lock-up mechanism comprises means for accurately adjusting the circumferential distance between the plate engaging hooks against which one edge of the plate is held by the spring tension applied to the opposite edge of the plate. By this adjustment the plates can be moved circumferentially of the cylinder to thereby secure the precise positioning of the plates necessary in color printing particularly. The springs 46, as shown in Fig. 6, are carried by bores 47 which extend through the printing cylinder and also provide bearings for members 48 through which the spring pressure is transmitted to the hooks 42. The members 48 comprise rod-like portions 49 upon which the springs are assembled and end portions of larger diameter, which extend beyond the bores 47 and engage lugs 50 formed on the hooks 42. After the spring 46 and members 48 are assembled in the bores 47 they are held in place by screws 51 whose ends project into notches 52 in the members 48. By this arrangement the springs and members 48 can be assembled in the cylinder and held in place before the bearings for the tension hook assemblies are attached to the cylinder, thus greatly facilitating the assembling of the mechanism.

It will be understood that the springs 46 normally hold the hooks 42 against the notches in the plates and that the splined shafts 40 serve to release the hooks when turned counter-clockwise to the position shown in Fig. 6.

The springs 46 are selected of a length and strength so as to provide the desired circumferential tension on the plates. Each hook is individually biased by its own spring and the lost motion connection between the individual hooks 42 and the spline shafts 40 permits each hook 42 a limited departure from alignment with other hooks solely under the pressure of its own spring, thus compensating for slight variations in the alignment of the notches in the plate.

Our improved cylinder construction also facilitates the relocation of the parts in the cylinder for various widths of plates and webs.

The hooks 52 which engage the notches in the opposite edges of the plates and hold the plates against the pull of the springs 46, are circumferentially adjustable so as to precisely position the plates circumferentially of the cylinder and thereby obtain the exact registration required for color printing.

The mechanism for adjusting the hooks 52 is shown in Figs. 6, 7 and 8. The hooks 52 are mounted for individual rotation on shafts 53 extending longitudinally of the cylinder parallel with the splined shafts 40. The hooks are individually biased in a direction to disengage the cylinder by springs 54 carried by the cover plates 55 which overlie the lock-up assembly when it is positioned in the cylinder, as will be later described. The hooks 52 are formed with lugs 56 which extend circumferentially of the cylinder from the shaft 53 on which the hooks are mounted and overlie a longitudinal slot 57 formed in the printing cylinder parallel with the shaft 53. Mounted in the slot for movement axially of the cylinder are wedge bars 58 which upon longitudinal movement effect an outward radial movement of a series of co-operating wedge members 59 which underlie the lugs 56 of the hooks 52 and thereby turn the hooks 52 against the pressure of springs 54 to accurately position the hooks circumferentially of the printing cylinder. The longitudinally movable bars 58 are adjusted by means of rack portions 60 formed on the bars adjacent the end of the cylinder, which rack portions are engaged by pinions 61 carried by a stub shaft 62 whose exposed ends are squared to receive a wrench. As will be noted, in Fig. 7, one of the wedge bars 58, in each of the slots 57, serves to adjust the hooks for the plates carried by the outer half of the cylinder, while the other serves to similarly adjust the hook 52 for the plates adjacent the mid-portion of the cylinder.

In order for the operator to note the position to which the wedge bars 58 are adjusted each of the wedge bars is provided with an extension 73 which projects beyond the end of the printing cylinder into the space between the bearing plates 85 and 86 (see particularly Figs. 1 and 2), the extensions being supported in brackets 74 attached to the reduced end portion of the cylinder, which brackets are provided with scale markings 75 between the wedge bar extensions.

Figure 4:
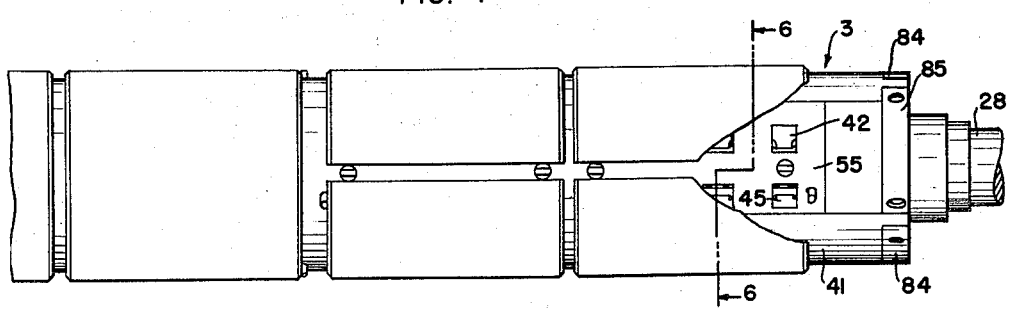
Fig. 4 is a plan view on a reduced scale of the printing cylinder.

The conventional newspaper printing cylinder, as shown in Fig. 4, is designed to carry eight semi-cylindrical plates, two at each end and two attached at each side of the mid-diameter of the cylinder. Consequently the mechanism for locking the plates to the cylinder must be designed so that the plates carried by the mid-section of the cylinder may be locked and unlocked by mechanism extending to the ends of the cylinder. The control mechanism for effecting the lock-up and release of the plates is duplicated at each end of the cylinder, each mechanism controlling the lock-up of the four semicircular plates carried by the adjacent half length of the printing cylinder.

The hooks 42 for two axially disposed plates at one end of the cylinder are all carried by a single spline shaft 40, while the hooks 52 which hold the opposite edges of the plate are separately adjustable for each plate. This is important as different adjustment may be required for the plates in order to obtain exact registration.

After the wedge bars 58 are adjusted for both plates both wedge bars are locked in position by a clamping screw 63a, see Fig. 9, mounted in the cylinder adjacent the stub shafts 62 of the pinions 61.

Also mounted on the spline shafts 40 adjacent every other hook 43 are plate lifting members 45, see Figs. 6 and 8, which, when the shafts 40 are turned to release the hooks 42 from engagement with the printing plates, engage the longitudinal edges of the plates and push the plates away from the cylinder so that the plates can be readily grasped at the ends by the operator and removed from the cylinder.

For convenience of assembly the shafts 40 carrying the hooks 42 for engaging one edge of one pair of printing plates and the shaft 53 and hooks 52 for engaging the adjacent edges of the other pair of plates are mounted on the cover plate 55 which overlies the longitudinal slot in the printing cylinder in which the parts are mounted. The cover plates 55 are attached to the printing cylinders by means of a series of arcuate clamping members 80 which embrace the shafts 40 at spaced intervals between the hooks 42 and are bolted to the overlying cover plate as shown more particularly in Fig. 6. The longitudinal recesses in the printing cylinder in which the lock-up mechanisms are mounted are formed with ribs 82 on their side walls to be engaged by edges of the cover plate and the ends of the members 80 when the clamping bolts are tightened to thereby clamp the cover plates and the assembled parts to the cylinders with the outer curved surface of the plates co-extensive with the surface of the cylinder.

Figure 5:
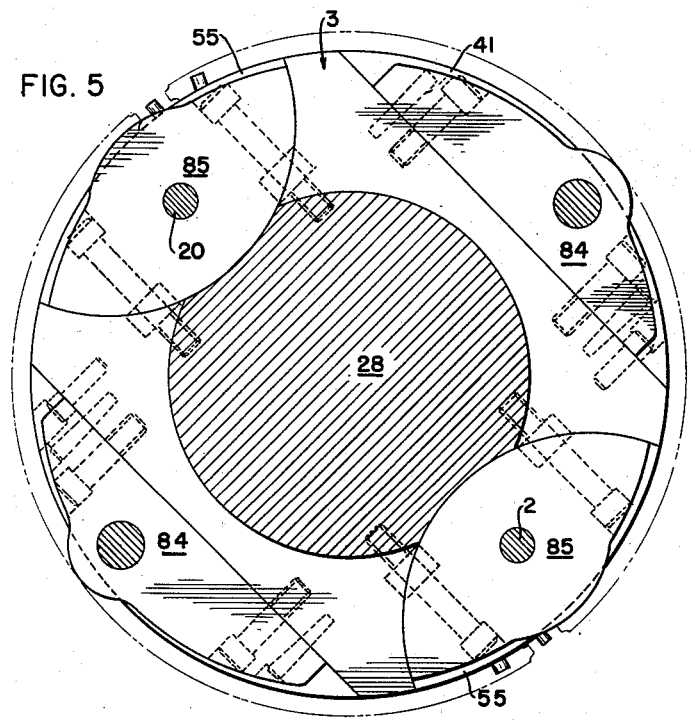
Fig. 5 is a transverse section on line 5—5 of Fig. 1.

As described above the ends of the printing cylinder are of reduced diameter and Fig. 5 shows the end of the main portion of the cylinder with the reduced portion in section. As here shown the ends 2 of the spline shafts 40 project through bearing plates 84 which are fitted in recesses cut in the ends of the cylinder and bolted to the cylinder. Bearing plates 85 for the shafts of the rocker arms 5 are similarly mounted on opposite sides of the cylinder. Attached to the reduced end of the cylinder in spaced relation with the bearing plates 84 and 85 are a pair of arcuate bearing plates 86, see Fig. 2, which provide support for the ends of the shafts with the previously described mechanism for oscillating the spline shafts mounted between the spaced bearing plates.

In the drawings the various parts are shown in the positions to which they are moved to release the hooks 42 from one of the semi-cylindrical printing plates. This movement was effected by shifting the handle 27 to the full line position shown in Fig. 2 to thereby connect port 18a of the cylinder 12 with the source of fluid pressure and turn the shaft 11 in a counter-clockwise direction and shift the cam 1 radially inward and rock one of the spline shafts 40 in a direction to release the hooks 42 and through the fingers 45 push the plate away from the cylinder so that it may be readily removed from the cylinder as shown in Fig. 6.

As will be noted in Fig. 2 the block 15 which provides a bearing for the rod 14 attached to the shaft 11 of the oscillator has attached to it a finger 90 which engages a switch member 91 of a safety switch 92 in the control circuit of the motor which rotates the printing cylinder and closes the switch when the oscillator shaft is turned to shift the cam member to its outward position.

The hand operated control for the lock-up mechanism is shown more particularly in Figs. 10 and 11, and is generally similar to the control described in our above mentioned prior patent. The cylinder construction and lock-up mechanism may be the same as above described in connection with the power operated control.

The cam member 63 for engaging and rocking the arm 4 to release the lock-up hooks is mounted at its upper end on a fixed pivot 64 for swinging movement toward and from the cylinder and comprises two cam surfaces 65, 66 and an intermediate portion 67. The cam member 63 is shifted toward and away from the cylinder by means of a crank 68 carried by a shaft 67' supported in the frame above the end of the printing cylinder and provided with a handle 69. Movement of the handle 69 to the left as shown in Fig. 10 from the dotted line position there shown, to full line position moves the cam inwardly in which position it is held by the spring 70 carried by one arm of a toggle 71 so arranged that the spring 70 holds the cam in either fully elevated or fully depressed position, as determined by the slot 72 in the frame bracket through which the handle 69 projects.

The above described control is designed to be operated after the printing cylinder has been stopped with the roller 4 in position to be engaged by the mid-portion 67 of the cam lever 63 but may be operated before the cylinder comes to rest in which case one of the cam surfaces 65, 66 depending upon the direction of rotation of the cylinder, will engage the roller 4 and force it inwardly to thereby turn the spline shaft 40 and release the hooks 42.

Co-operating with the cam lever 63 is a stationary cam 76 which surrounds the reduced end of the cylinder in the space between the bearing plate 86 and the frame, the cam 76 having cam surfaces opposite the cam surfaces 65 and 66 of the cam lever 63 adapted to engage the roller 4 on the end of the rock arm 5 and move the roller outwardly as the printing cylinder revolves. The rocking of the spline shafts 40 will ordinarily be effected by the expansion of the springs 46 which normally bias the hooks 42 in a direction to lock-up the printing plates. The cam 76 insures this movement in the event the mechanism should bind and not move freely.

Radial pins 77 project from the printing cylinder adjacent the rollers 4 which pins on the rotation of the printing cylinder engage the end of an arm 78 projecting from the shaft of the toggle 68 which operates the cam lever 63. Engagement of the pins with the arm 78 serves to turn the handle 69 sufficiently for the spring 70 to complete the movement of the shaft to its running position with the cam lever withdrawn from the path of movement of the roller 4.

The above described construction provides an extremely rugged tension lock-up mechanism which nevertheless provides a micrometer adjustment of the hooks in a manner to take care of all variations in the position of the lock-up notches within permissible manufacturing tolerances and permit plate registration for color printing.

The hooks 52 are solidly backed by the wedge bars working in the grove in the printing cylinder and hold the edges of the plates as firmly against the lock-up tension as the fixed hooks of the prior art.

The hooks 42 with their long hubs supported on the spline shaft 40 also provide a rugged assembly wherein the individual hooks are free to move under the pressure of the respective springs but are held in absolute alignment for movement about a common axis.

The mounting of the shafts 40 and 52 on the cover blocks 55 provides a rigid structure which can be precisely positioned in the cylinder without requiring extensive precision machining.

The power operated control for actuating the lock-up mechanism is fast and safe in operation and reduces the time required to change the printing plates and the mechanism as a whole contributes significantly to the quality of the printing with an over-all saving in time.

In the foregoing specification, we have described our improved lock-up mechanism as now designed for commercial installation but it will be understood that our invention is not limited to the particular mechanisms described except in so far as recited in the appended claims.

We claim:

1. A tension lock for attaching printing plates to printing cylinders comprising an oscillating shaft extending axially of said cylinder adjacent its perimeter, lock-up hooks mounted on said shaft, a movable member for oscillating said shaft mounted on the end of said cylinder, a power operated member positioned to engage and shift said movable member in a direction to release said lock-up hooks, a normally inoperative control for said power operated member, and means carried by said cylinder and co-operating with said control for rendering said control operative to move said power operated member in a direction to release said hooks when said cylinder is in a predetermined rotative position; said means locking said printing cylinder from rotating from said predetermined rotative position when said control is operative.

2. The mechanism of claim 1 wherein the control for said power operated member includes means for rendering the driving motor for the printing cylinder inoperative when the plates are released.

3. The mechanism of claim 1 wherein said power operated member consists of a cam having a middle part for positioning said movable member in position to release the lock-up hooks and inclined cam surfaces leading from both ends to said middle portion.

4. A tension lock-up for printing plates comprising a series of lock-up hooks extending axially of the press cylinder, a splined shaft on which said lock-up hooks are supported, said lock-up hooks each having a portion shaped substantially complementary to said splined shaft to provide a lost motion connection between said shaft and said hooks and to provide said lock-up hooks independent limited rotative movement, helical compression springs positioned in transverse bores in said cylinder, plungers in said bores engaging said springs and said hooks to independently bias said hooks in a direction to project said hooks into engagement with the lock-up notches in the printing plates, and movable means for turning said shaft against the tension of the springs to release said plates.

5. The mechanism of claim 4 including means for limiting the movement of said plungers.

6. A printing cylinder having an axially extending trough-shaped recess, a cover plate for said recess having a curved outer surface co-extensive with the surface of said cylinder, supporting projections for said cover plate in the side walls of said recess, means for clamping said cover plate to said projections, a shaft mounted for rotation on said cover plate, lock-up hooks mounted on said shaft and a series of independent springs mounted in said cylinder and positioned to engage said hooks and project them outwardly and circumferentially into engagement with the lock-up notches in printing plates carried by said cylinder.

7. The mechanism of claim 6 wherein said hooks have a limited movement on said supporting shaft.

8. The mechanism of claim 6 including a second shaft mounted on said cover plate, oppositely facing lock-up hooks on said second shaft and adjusting means for simultaneously adjusting said lock-up hooks about said shaft, said means being supported in said cylinder independently of said cover plate and having parts positioned to engage said hooks when said cover plate is attached to said cylinder.

9. The mechanism of claim 8 wherein said adjusting means comprises a bar mounted for longitudinal movement in said cylinder adjacent said hooks, said bar having a series of inclined surfaces respectively engaging said hooks.

10. A tension lock-up for stereotype printing plates comprising a printing cylinder, a lock-up mechanism carried thereby, a swinging arm on said cylinder movable in a plane transverse to the axis of said cylinder for adjusting said lock-up mechanism, a movable member mounted adjacent the cylinder in position to engage and operate said first-named member when said cylinder is in a predetermined rotative position and means for moving said last-named member in a path approximately radial but modified to compensate for the swinging movement of said arm.

References Cited in the file of this patent

UNITED STATES PATENTS

| 954,090 | Goss | Apr. 5, 1910 |
| 1,257,834 | Fankboner | Feb. 26, 1918 |
| 1,340,355 | Wood | May 18, 1920 |
| 1,708,196 | Wood | Apr. 9, 1929 |
| 1,856,162 | Isbell | May 3, 1932 |
| 1,982,757 | Roesen | Dec. 4, 1934 |
| 2,050,950 | Huck | Aug. 11, 1936 |
| 2,109,152 | Meisel | Feb. 22, 1938 |
| 2,236,230 | Worthington | Mar. 25, 1941 |
| 2,428,263 | Crafts et al. | Sept. 30, 1947 |
| 2,474,127 | Tollison et al. | June 21, 1949 |
| 2,639,668 | Chase et al. | May 26, 1953 |
| 2,708,407 | Albrecht | May 17, 1955 |
| 2,708,875 | Harless | May 24, 1955 |
| 2,732,798 | Chase | Jan. 31, 1956 |
| 2,818,806 | Harless | Jan. 7, 1958 |

FOREIGN PATENTS

| 455,739 | Great Britain | Oct. 27, 1936 |
| 633,098 | Great Britain | Dec. 12, 1949 |